United States Patent
Kim et al.

(10) Patent No.: US 9,692,581 B1
(45) Date of Patent: Jun. 27, 2017

(54) SYSTEMS AND METHODS FOR LOAD AND INTERFERENCE COORDINATION IN A WIRELESS COMMUNICATION NETWORK

(71) Applicant: Sprint Spectrum LP, Overland Park, KS (US)

(72) Inventors: Yun Sung Kim, Ashburn, VA (US); Sanghoon Sung, Ashburn, VA (US); Pinal Tailor, Ashburn, VA (US); Tri Duong, Annandale, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 172 days.

(21) Appl. No.: 14/611,312

(22) Filed: Feb. 2, 2015

(51) Int. Cl.
*H04W 4/00* (2009.01)
*H04L 5/00* (2006.01)
*H04W 56/00* (2009.01)

(52) U.S. Cl.
CPC .......... *H04L 5/0073* (2013.01); *H04L 5/0005* (2013.01); *H04L 5/0032* (2013.01); *H04W 56/001* (2013.01)

(58) Field of Classification Search
CPC ... H04L 5/0073; H04L 5/0005; H04L 5/0032; H04W 56/001
USPC .................................. 370/329–330, 335–345
See application file for complete search history.

(56) References Cited

U.S. PATENT DOCUMENTS

| | | | |
|---|---|---|---|
| 8,743,723 B2 | 6/2014 | Watfa et al. | |
| 2011/0310830 A1* | 12/2011 | Wu | H04W 72/1289 370/329 |
| 2013/0044600 A1* | 2/2013 | Sridhar | H04W 36/04 370/235 |
| 2013/0107798 A1* | 5/2013 | Gao | H04W 72/1226 370/328 |
| 2013/0107826 A1* | 5/2013 | Dinan | H04W 16/32 370/329 |
| 2014/0162662 A1* | 6/2014 | Nagata | H04W 28/16 455/444 |
| 2014/0269457 A1 | 9/2014 | Folke et al. | |
| 2014/0321434 A1* | 10/2014 | Gayde | H04W 72/0426 370/336 |
| 2015/0029907 A1* | 1/2015 | Cucala Garcia | H04L 5/0073 370/278 |
| 2015/0029988 A1* | 1/2015 | Chai | H04W 72/0426 370/329 |
| 2015/0119053 A1* | 4/2015 | Morimoto | H04W 16/08 455/450 |
| 2016/0021621 A1* | 1/2016 | Wu | H04W 52/244 370/311 |

* cited by examiner

*Primary Examiner* — Thai Hoang

(57) ABSTRACT

Systems and methods are described for generating a common subframe pattern in a wireless communication network. Frame numbers associated with a plurality of access nodes operating on the same frequency channel in a coverage area are synchronized. A unique almost blank subframe (ABS) ratio associated with each of the plurality of access nodes is determined. A common subframe pattern may be generated based on the determined unique ABS ratios. The common subframe pattern may be provided to each of the plurality of access nodes operating in the coverage area. Traffic may be scheduled using the generated common subframe pattern and the synchronized frame numbers.

12 Claims, 6 Drawing Sheets

| ABS PERCENTAGE | ENABLING BIT SEQUENCE IN BITMAP (0-39) |
|---|---|
| 2.5% | 1 |
| 5.0% | 1, 21 |
| 7.5% | 1, 11, 21 |
| 10.0% | 1, 11, 21, 31 |
| 12.5% | 1, 5, 11, 21, 31 |
| 15.0% | 1, 5, 11, 21, 25, 31 |
| 17.5% | 1, 5, 11, 15, 21, 25, 31 |
| 20.0% | 1, 5, 11, 15, 21, 25, 31, 35 |
| 22.5% | 1, 5, 9, 11, 15, 21, 25, 31, 35 |
| 25.0% | 1, 5, 9, 11, 15, 21, 25, 29, 31, 35 |
| 27.5% | 1, 5, 9, 11, 15, 19, 21, 25, 29, 31, 35 |
| 30.0% | 1, 5, 9, 11, 15, 19, 21, 25, 29, 31, 35, 39 |
| 32.5% | 1, 3, 5, 9, 11, 15, 19, 21, 25, 29, 31, 35, 39 |
| 35.0% | 1, 3, 5, 9, 11, 15, 19, 21, 23, 25, 29, 31, 35, 39 |
| 37.5% | 1, 3, 5, 9, 11, 13, 15, 19, 21, 23, 25, 29, 31, 35, 39 |
| 40.0% | 1, 3, 5, 9, 11, 13, 15, 19, 21, 23, 25, 29, 31, 33, 35, 39 |
| 42.5% | 1, 3, 5, 7, 9, 11, 13, 15, 19, 21, 23, 25, 29, 31, 33, 35, 39 |
| 45.0% | 1, 3, 5, 7, 9, 11, 13, 15, 19, 21, 23, 25, 27, 29, 31, 33, 35, 39 |
| 47.5% | 1, 3, 5, 7, 9, 11, 13, 15, 17, 19, 21, 23, 25, 27, 29, 31, 33, 35, 39 |
| 50.0% | 1, 3, 5, 7, 9, 11, 13, 15, 17, 19, 21, 23, 25, 27, 29, 31, 33, 35, 37, 39 |

FIG. 3B

| ABS PERCENTAGE | ENABLING BIT SEQUENCE IN BITMAP (0-19) FOR SUBFRAME CONFIGURATION (DSUUD DSUUD DSUUD DSUUD) |
|---|---|
| 12.5% | 4 |
| 25.0% | 4, 14 |
| 37.5% | 4, 9, 14 |
| 50.0% | 4, 9, 14, 19 |

FIG. 3C

SYSTEMS AND METHODS FOR LOAD AND INTERFERENCE COORDINATION IN A WIRELESS COMMUNICATION NETWORK

TECHNICAL BACKGROUND

In a heterogeneous network, small access nodes (e.g., short range, low power access node) can be deployed at macro access node (e.g., strongest signal strength) hotspots to increase network system capacity. For example, carrier aggregation is a technique used by macro access nodes for consolidating wireless spectrum and frequency bands to "free-up" wireless spectrum for allocation to the deployed small access nodes. This enables increased data throughput to wireless devices operating within the coverage area of the macro access node. In some instances, however, aggressive deployment of small access nodes within the coverage area of the macro access node may result in decreased throughput to wireless devices operating at cell edges of the small access nodes due to radio interference from neighboring cells.

Inter-cell interference coordination techniques, for example, designating subframes as almost blank subframes (ABS), create opportunities for wireless devices operating at the cell edges of small access nodes to receive downlink information from the network without interference from the macro access node. In some instances, neighboring macro access nodes may assign out-of-sequence patterns of ABS to the small access nodes, which creates interference at the cell edges of the small access nodes resulting in increased interference to wireless devices and decreased throughput

Overview

Systems and methods are described for generating a common subframe pattern in a wireless communication network. In one instance, frame numbers associated with a plurality of access nodes operating on a same frequency channel in a coverage area are synchronized. A unique almost blank subframe (ABS) ratio associated with each of the plurality of access nodes is determined. A common subframe pattern may be generated based on the determined unique ABS ratios. The common subframe pattern may be provided to each of the plurality of access nodes operating in the coverage area. Traffic may be scheduled using the generated common subframe pattern and the synchronized frame numbers.

BRIEF DESCRIPTION OF THE DRAWINGS

FIGS. 3B and 3C illustrate exemplary almost blank subframe (ABS) pattern generation tables for generating a common subframe pattern in a wireless communication network.

DETAILED DESCRIPTION

In operation, deployment of small access nodes (e.g., short range, low power access node) within a signal radius of macro access nodes (e.g., strongest signal strength) provides high data rates for wireless device users and reduces overload of the macro access nodes. Interference can occur at the cell edge of the small access nodes due to the reference signal strength of the macro access node in co-channel deployed communication networks. In some instances, inter-cell interference coordination techniques, for example, designating subframes as almost blank subframes (ABS), create opportunities for wireless devices at the cell edge of the small access node to receive downlink information without interference from the macro access node.

For example, in an exemplary embodiment, transmissions from the macro access node, inflicting high interference on the small access node users, can be periodically muted (stopped) during the designated ABS frames. Small access node users suffering interference from the aggressor macro access node are served during the designated ABS frames. This mitigates co-channel interference by reserving portions of wireless spectrum for the small access node users to receive downlink (DL) data from the communication network. Since transmissions from the macro access node are muted during the reserved portions of wireless spectrum radio interference from the macro access node is decreased increasing throughput to the small access node users and overall network system capacity.

Figure 1:
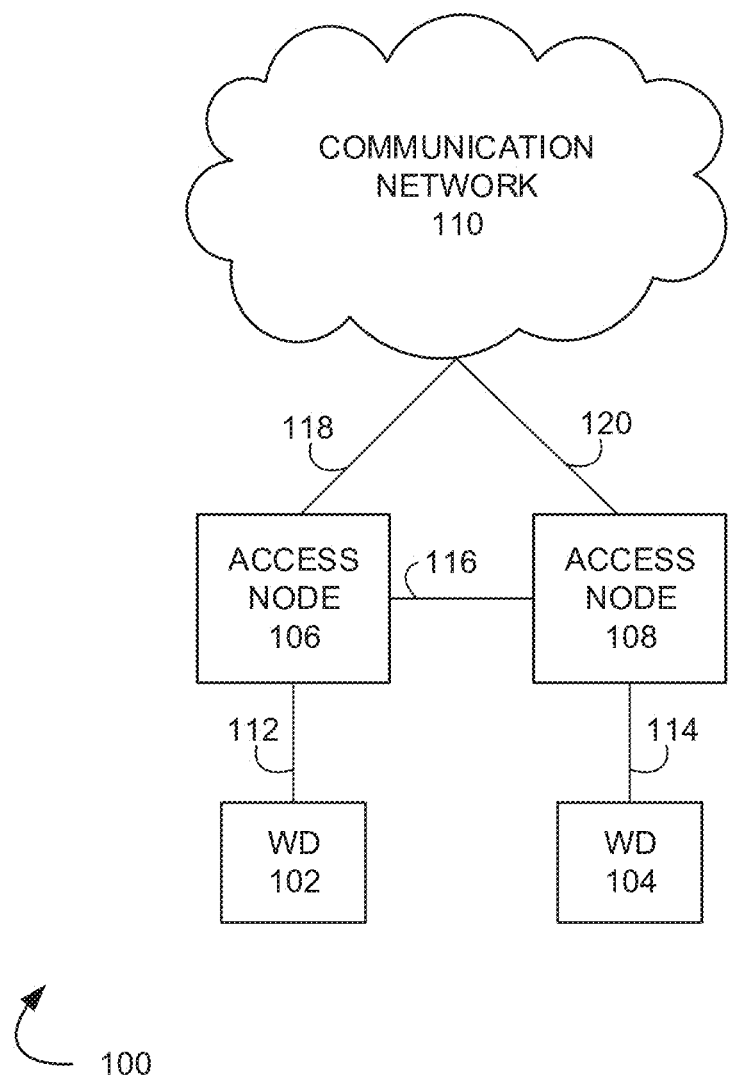
FIG. 1 illustrates an exemplary communication system for generating a common subframe pattern in a wireless communication network.

FIG. 1 illustrates an exemplary communication system 100 for generating a common subframe pattern in a wireless communication network. Communication system 100 can comprise a wireless devices 102, 104, access nodes 106, 108, and communication network 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106, 108 and communication network 110, which are omitted for clarity, including additional processing nodes, routers, gateways, and physical and/or wireless data links for carrying data among the various network elements.

Wireless devices 102, 104 can be any device configured to communicate over system 100 using a wireless communication link. For example, wireless devices 102, 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in respective communication with each of access nodes 106, 108, any number of wireless devices can be implemented according to various exemplary embodiments disclosed herein.

Wireless devices 102, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 106, 108 can be any network node configured to provide communication between wireless devices 102, 104 and communication networks 110. Access nodes 106, 108 can be short range access nodes or standard access nodes. A short range access node could include a microcell base station, a picocell base station, a femtocell base station, or the like. A standard access node could include a base transceiver station, a radio base station, an eNodeB device, or an enhanced eNodeB device, or the like. It is noted that while two access nodes 106, 108 are illustrated in FIG. 1, any number of access nodes can be implemented within system 100.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying data, for example, to support voice, push-to-talk, broadcast video, and data communications by a wireless device, for example, wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

Communication links 112, 114, 116, 118, 120 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links 112, 114, 116, 118, 120 can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114, 116, 118, 120 can be a direct link or might include various equipment, intermediate components, systems, and networks.

Figure 2A:
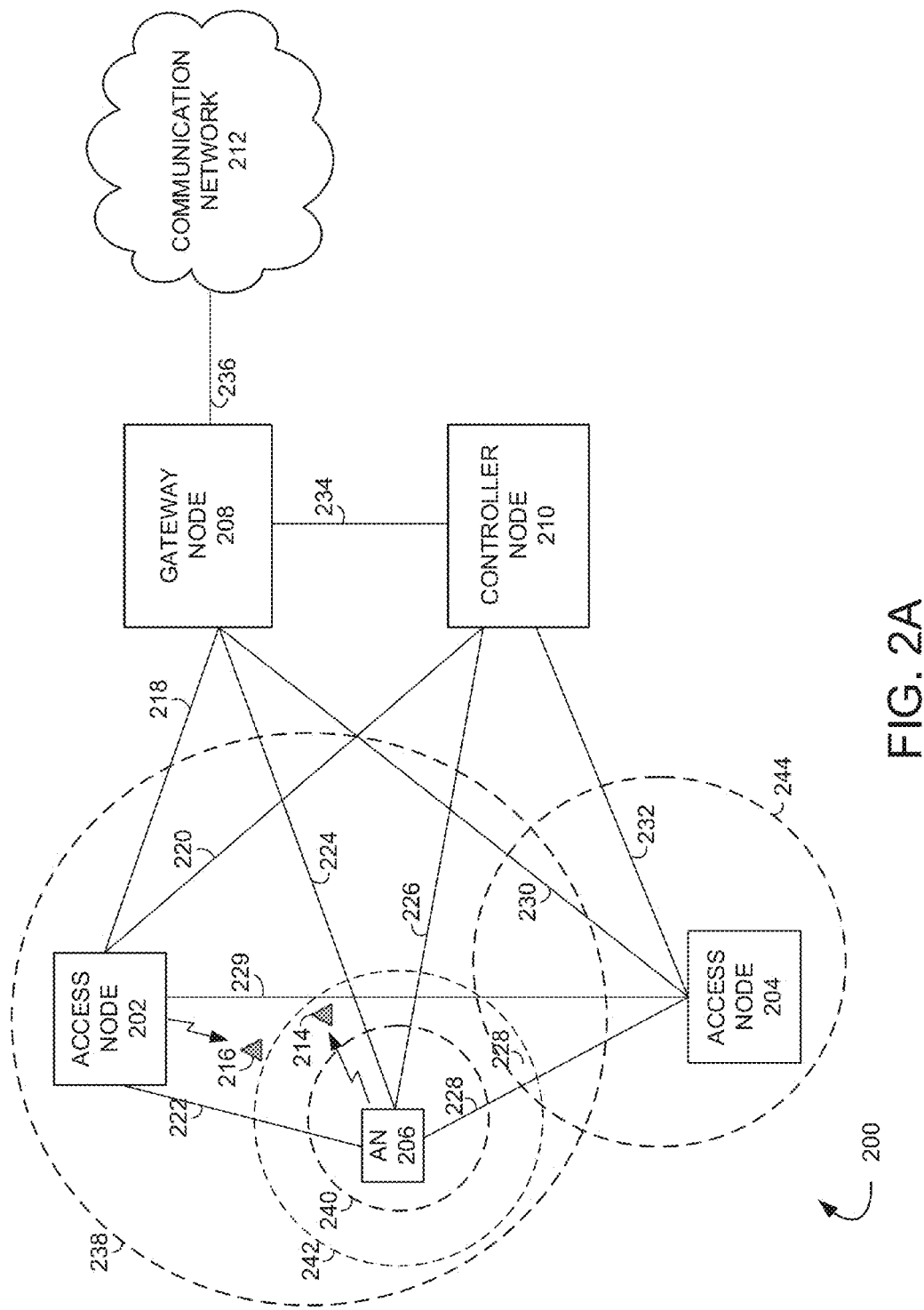
FIG. 2A illustrates another exemplary communication system for generating a common subframe pattern in a wireless communication network.
Figure 2B:
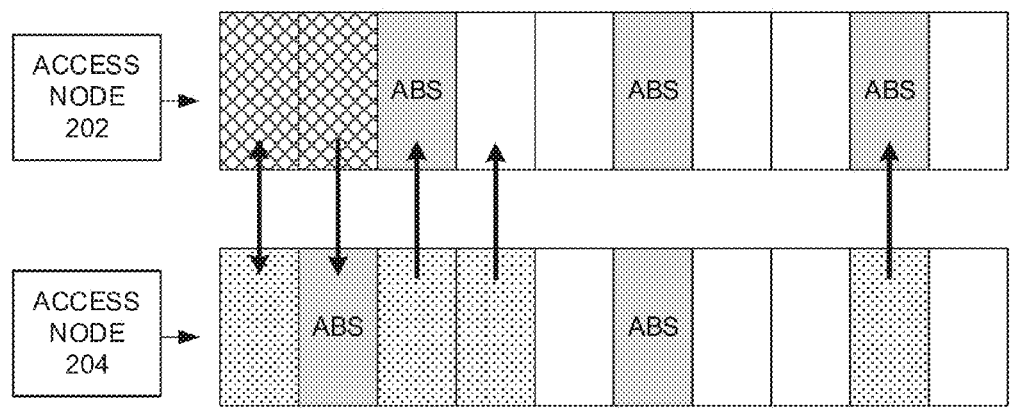
FIG. 2B illustrates exemplary unique almost blank subframe (ABS) ratios associated access nodes in a coverage area.
Figure 2C:
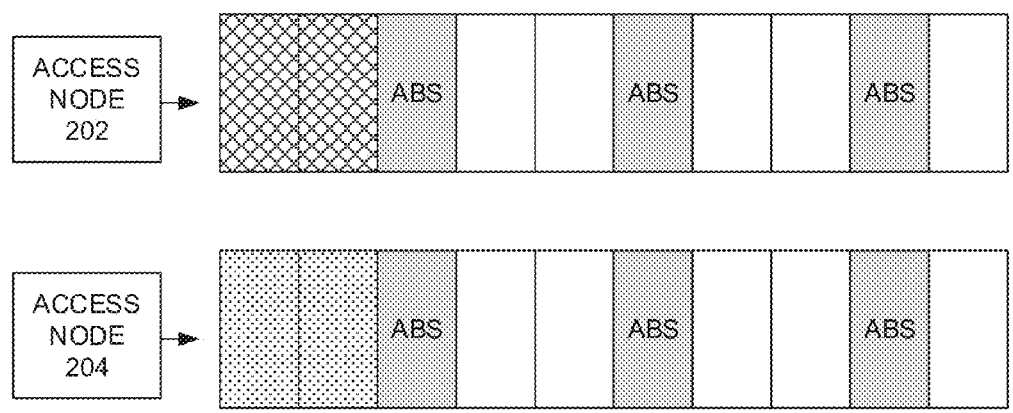
FIG. 2C illustrates an exemplary common subframe pattern associated with access nodes in a coverage area.

FIG. 2A illustrates an exemplary communication system 200 for generating a common subframe pattern in a wireless communication network. FIG. 2B illustrates exemplary unique almost blank subframe (ABS) ratios associated access nodes in a coverage area and FIG. 2C illustrates an exemplary common subframe pattern associated with access nodes in a coverage area.

Communication system 200, illustrated in FIG. 2A, can comprise wireless devices 214, 216, access nodes 202, 204, 206, gateway node 208, controller node 210, and communication network 212. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 202, 204, 206 and communication network 212, which are omitted for clarity, including additional processing nodes, routers, gateways, and physical and/or wireless data links for carrying data among the various network elements.

Wireless devices 214, 216 can be any device configured to communicate over communication system 200 using a wireless interface. For example, wireless devices 214, 216 can include a remote terminal unit, a cell phone, a smart phone, a computing platform such as a laptop, palmtop, or a tablet, a personal digital assistant, or an internet access device, and combinations thereof.

The wireless interface of wireless devices 214, 216 can include one or more transceivers for transmitting and receiving data over communication system 200. Each transceiver can be associated with the same or different frequency bands, the same or different radio access technologies, the same or different network providers, and/or the same or different services. For example, wireless devices 214, 216 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIG. 2 for clarity, wireless devices 214, 216 can be in communication with access nodes 202, 204, 206 through communication links. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 214 and access node 206 could be transferred over different communication sessions, frequencies, timeslots, packets, ports, sockets, logical transport links, or in different directions—including combinations thereof.

Wireless devices 214, 216 can transmit and/or receive information over communication system 200 using various communication services. These services can include various voice, data, and/or MBMS services and applications. For example, mobile voice services, mobile data services, push-to-talk services, internet services web browsing, email, pictures, picture messaging, video, video messaging, broadcast video, audio, voicemail, music, MP3's, ring tones, stock tickers, new alerts, etc.

Access nodes 202, 204, 206 can be any network node configured to provide communication between wireless devices 214, 216 and communication network 212. Access nodes 202, 204, 206 can be standard access nodes or short range, low power access nodes. In an exemplary embodiment, access nodes 202, 204 can be standard access nodes having respective coverage areas 238, 244. Access node 206 can be a short range, low power access node or small access node having a coverage area 242. Access nodes 204, 206 can each overlap at least a portion of coverage area 238 of access node 202. Each access node 202, 204, 206 has a coverage area that includes a cell edge portion between the full strength coverage area, for example, coverage area 240 of access node 206, and the edge of the cell coverage area 238, 242, 244.

A standard access node can be a macrocell access node such as a base transceiver station, a radio base station, an eNodeB device, or an enhanced eNodeB device, or the like. A short range access node can include a microcell base station, a picocell base station, a femtocell base station, or the like such as a home NodeB or a home eNodeB device. In addition, a wireless device configured to enter a hotspot mode can be a femtocell access node. It is noted that while three access nodes 202, 204, 206 are illustrated in FIG. 2, any number of access nodes can be implemented within system 200.

Access nodes 202, 204, 206 can comprise a processor and associated circuitry to execute or direct the execution of computer-readable instructions to obtain information. Access nodes 202, 204, 206 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 202, 204, 206 can receive instructions and other input at a user interface.

Gateway node 208 can be any network node configured to interface with other network nodes using various protocols that communicates, routes, and forwards communication data addressed to a wireless devices 214, 216. In addition, gateway node 208 can act as a mobility anchor for wireless devices 214, 216 during handovers between different frequencies and/or different radio access technologies supported by the same access node. Gateway node 208 can be a standalone computing device, computing system, or network component, and can be accessible, for example, by a wired or wireless connection, or through an indirect connection such as through a computer network or communication network. For example, gateway node 208 can include a serving gateway (SGW) and/or public data network gateway (PGW), etc. One of ordinary skill in the art would recognize that gateway node 208 is not limited to any specific technology architecture, such as Long Term Evolution (LTE) and can be used with any network architecture and/or protocol.

Gateway node 208 can comprise a processor and associated circuitry to execute or direct the execution of computer-readable instructions to obtain information. Gateway node 208 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 208 can receive instructions and other input at a user interface.

Controller node 210 can be any network node configured to communicate information and/or control information over communication system 200. Controller node 210 can be configured to transmit control information associated with a handover procedure. Controller node 210 can be a standalone computing device, computing system, or network component, and can be accessible, for example, by a wired or wireless connection, or through an indirect connection such as through a computer network or communication network. For example, controller node 210 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 210 is not limited to any specific technology architecture, such as Long Term Evolution (LTE) and can be used with any network architecture and/or protocol.

Controller node 210 can comprise a processor and associated circuitry to execute or direct the execution of computer-readable instructions to obtain information. Controller node 210 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 210 can receive instructions and other input at a user interface.

Access node 202 can be in communication with gateway node 208 through communication link 218 and with controller node 210 through communication link 220. Access node 202 can be in communication with access node 206 through communication link 222. Access node 206 can be in communication with gateway node 208 through communication link 224 and with controller node 210 through communication link 226. Access node 206 can be in communication with access node 204 through communication link 228. Access node 204 can be in communication with access node 202 through communication link 229, gateway node 208 through communication link 230, and with controller node 210 through communication link 232. Controller node 210 can be in communication with gateway node 208 through communication link 234 and with communication network 212 through communication link 236.

Communication links 218, 220, 222, 224, 226, 228, 229, 230, 232, 234, 236 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 218, 220, 222, 224, 226, 228, 229, 230, 232, 234, 236 can be a direct link or might include various equipment, intermediate components, systems, and networks.

Communication network 212 can be a wired and/or wireless communication network, and can comprise processing nodes, routers, gateways, and physical and/or wireless data links for carrying data among various network elements, including combinations thereof, an can include a local area network, a wide area network, and an internetwork (including the Internet). Communication network 212 can be capable of carrying data, for example, to support voice, push-to-talk, broadcast video, and data communications by a wireless device, for example, wireless device 214. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 212 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 212 can also comprise additional base stations, controller nodes, telephony switches, internet routers, network gateways, computer systems, communication links, or some other type of communication equipment, and combinations thereof.

In operation, as illustrated in FIG. 2A, deployment of small access node 206 (e.g., short range, low power access node) within a signal radius 238 of macro access node 202 (e.g., strongest signal strength) provides high data rates for wireless devices 214, 216 and reduces overhead of macro access nodes 202, 204. Inter-cell interference coordination techniques, for example, frequency-domain partitioning or designating almost blank subframes (ABS), create opportunities for wireless devices 214, 216 at cell edge 242 of small access node 206 to receive downlink information from small access node 206 without interference from macro access nodes 202, 204.

For example, macro access nodes 202, 204 can segment wireless spectrum to mitigate co-channel interference with small access node 206, e.g., resource partitioning. Frequency-domain partitioning protects the downlink (DL) signaling of small access node 206 at cell edge 242 by using carrier aggregation (CA) techniques to exploit fragmented wireless spectrum and schedule use of data resources. Time-domain partitioning protects the DL signaling of small access node 206 at cell edge 242 by periodically muting (stopping) transmissions from macro access nodes 202, 204 in designated subframes, e.g., Almost Blank Subframes (ABS), to reduce co-channel interference. In an exemplary embodiment, small access node 206 is provided data about the frequency-domain partitioning and set of muted ABS over, for example, X2 interfaces 222, 228. The small access node 206 can use the data to schedule wireless devices 214, 216 located at the cell edge 242 of small access node 206.

In another exemplary embodiment, illustrated in FIG. 2B, neighboring macro access nodes, for example, macro access node 202, 204, may generate conflicting, out-of-sequence ABS patterns that comprise unique ABS ratios. Data about the conflicting, out-of-sequence ABS patterns may be transmitted by macro access nodes 202, 204 to small access node 206 over, for example, separate X2 interfaces 222, 228. Interference may occur at cell edge 242 of small access node 206 due to the conflicting, out-of-sequence ABS patterns generated by macro access nodes 202, 204. For example, as illustrated in FIG. 2B, because the ABS patterns of macro access nodes 202, 204 are not congruent, the DL signaling of small access node 206 at cell edge 242 may experience co-channel interference from neighboring macro access nodes 202, 204 that each comprise data load subframes that conflict with a designated ABS of the other neighboring macro access node 202, 204.

Incongruent ABS patterns of neighboring macro access nodes 202, 204 may result in decreased throughput to wireless devices 214, 216 operating at cell edge 242 of small access node 206 due to, for example, increased radio interference caused by access node 204 transmissions during the designated ABS of access node 202. Consequently, generating a common ABS pattern, as illustrated in FIG. 2C, for neighboring macro access nodes 202, 204 operating in a geographic area is desirable.

Figure 3A:
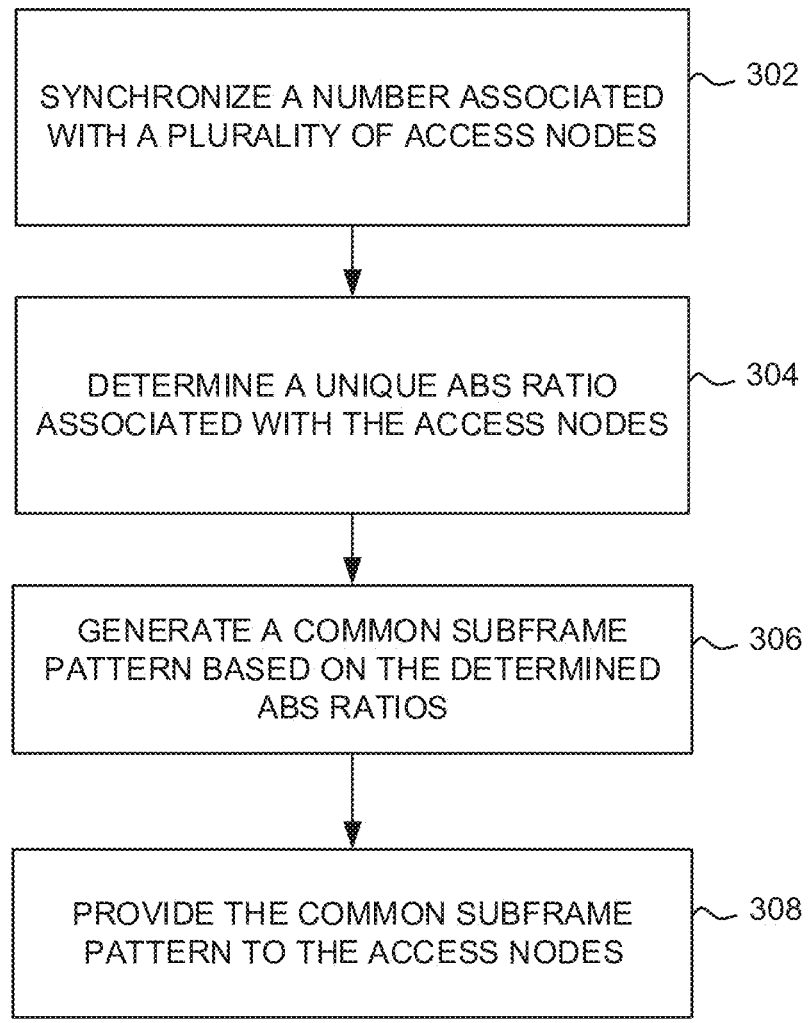
FIG. 3A illustrates an exemplary method for generating a common subframe pattern in a wireless communication network.

FIG. 3A illustrates a flow chart of an exemplary method for generating a common subframe pattern in a wireless communication network. FIGS. 3B and 3C illustrate exemplary almost blank subframe (ABS) pattern generation tables used for generating the common subframe pattern illustrated in FIG. 3A. The method of FIG. 3A will be discussed with reference to the exemplary communication system 200 illustrated in FIGS. 2A-2C. However, the method can be implemented in the exemplary communication system 100 illustrated in FIG. 1 and with any suitable communication system. In addition, although FIG. 3A depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 3A, at step 302, a network node can synchronize a frame number associated with a plurality of access nodes. For example, in an exemplary embodiment, small access node 206 (e.g., short range, low power access node) is deployed within a signal radius 238 of macro access nodes 202, 204 (e.g., strongest signal strength). Wireless devices 214, 216 located within a geographic coverage area of the signal radii 238, 242, 244 of access nodes 202, 204, 206 receive System Information Blocks (SIB) messages "SIBMessage" that contain a value of a System Frame Number (SFN) associated with access nodes 202, 204, 206 via, for example, BCH or PBCH channels. SFN's are, for example, $n_{bits}$ wide and, in an exemplary embodiment, are synchronized across all access nodes 202, 204, 206 operating in the geographic coverage area.

In an exemplary embodiment, access nodes 202, 204, 206 operate in a synchronized mode. For example, access node 206 may operate on a unique time interval, for example, 10 milliseconds, and comprise SFN's that range from 0 to 1023. Access node 202 may operate on a different unique time interval from access node 206, for example, 1 millisecond, and comprise SFN's that range from 0 to 987. Before access nodes 202 and 206 can communicate with each other, access nodes 202, 206 must complete a timing synch (e.g., synchronize the respective timing intervals of access nodes 202, 206) and set a common range for the SFN's, for example, a range from 0-1023. After the timing synch has been completed for access nodes 202, 204, 206 and the common range for the SFN's set, access nodes 202, 204, 206 can complete a timing synch with wireless devices 214, 216 (e.g., synchronize a respective timing interval of access nodes 202, 204, 206 and wireless devices 214, 216) and set a common range for SFN's of access nodes 202, 204, 206 and subframe numbers of wireless devices 214, 216.

At step 304, a unique ABS ratio associated with network nodes is determined. For example, interference can occur at cell edge 242 of small access node 206 due to the signal strength of macro access node 202. In an exemplary embodiment, time-domain partitioning protects the DL signaling of small access node 206 at cell edge 242 by periodically muting (stopping) transmissions from macro access nodes 202 in designated subframes, e.g., Almost Blank Subframes (ABS), to reduce co-channel interference.

In some instances, a neighboring macro access node, for example, macro access node 204, may generate an ABS pattern that comprises a unique ABS ratio that is out-of-sequence with the ABS pattern generated by access node 202. Data about the conflicting, out-of-sequence ABS patterns are transmitted by the macro access nodes 202, 204 to small access node 206 over, for example, X2 interfaces 222, 228.

For example, macro access nodes 202, 204 provide data about the sets of muted ABS to small access node 206 in a load information messages "ABSInformation" over, for example, X2 interfaces 222, 228. The ABSInformation messages contain ABS pattern information "ABSPattern-Info" that indicate subframes designated by macro access nodes 202, 204 as ABS for the purpose of interference coordination. ABS are measured in bit maps and are approximately $n_{bits}$ wide. Each position in the bitmap represents an ABS or non-ABS DL subframe. For example, a position value "1" in the bitmap may indicate an ABS. A position value "0" in the bitmap may indicate a non-ABS. In an exemplary embodiment, the first position of the ABS pattern may correspond, for example, to subframe "0" in a radio frame where the SFN equals zero.

Because the ABS ratios of macro access nodes 202, 204 are unique, the ABS patterns generated by macro access nodes 202, 204 may not be congruent. Incongruent ABS patterns of neighboring macro access nodes 202, 204 may result in decreased throughput to wireless devices 214, 216 operating at cell edge 242 of small access node 206 due to, for example, increased radio interference caused by macro access node 204 transmissions during the designated ABS of macro access node 202. In an exemplary embodiment, a unique ABS ratio associated with each macro access node 202, 204 may be determined, for example, from vendor specific algorithms. A common ABS pattern for macro access nodes 202, 204 may be generated based on the unique ABS ratios for macro access nodes 202, 204 located in the geographic coverage area.

At step 306, a common subframe pattern may be generated based on the determined ABS ratios. For example, in an exemplary embodiment, each macro access nodes 202, 204 located in the geographic coverage area may comprise an ABS pattern generator. The ABS pattern generator can be, for example, gateway node 208, controller node 210, or processor node 400 illustrated in FIG. 4, and may be, for example, embedded in access nodes 202, 204, 206, adjacent to access nodes 202, 204, 206, or an element of communication network 212. The ABS pattern generator (not shown) may be configured to generate an ABS pattern based on the determined unique ABS ratios of each macro access node 202, 204 located in the geographic coverage area. For example, as illustrated in FIG. 3B, the ABS pattern generator may generate an ABS table that includes a maximum number of ABS based on bitmap (FDD=40 subframes, TDD=20 subframes). In one exemplary embodiment, the maximum number of ABS based on a bitmap of 0-39 is 40 subframes and can be designated as a percentage, for example, 12.5%, and the enabling bit sequence for a subframe configuration based on the generated ABS table can be, for example, 1, 5, 11, 21, 31.

In another exemplary embodiment, for example in an FDD system, the maximum bitmap ABS, e.g., 40, corresponds to four consecutive radio frames. Thus, the ABS pattern may repeat every 40 milliseconds (ms) from SFN "0". The amount of ABS can be determined by the macro access node 202, 204 using its own algorithm.

In another exemplary embodiment, for example in a TDD system illustrated in FIG. 3C, the maximum number of ABS based on bitmap is 20 subframes. The maximum bitmap ABS, e.g., 20, corresponds to two consecutive radio frames. Thus, the ABS pattern may repeat every 20 ms from SFN "0". The amount of ABS can be determined by the macro access node 202, 204 using its own algorithm. Special subframes may be excluded from the ABS bitmap consideration. In one exemplary embodiment, illustrated in FIG. 3C, the maximum number of ABS based on a bitmap of 0-19 is 20 subframes and can be designated as a percentage, for example, 12.5%, and the enabling bit sequence for a subframe configuration based on the generated ABS table can be, for example, 4.

The common ABS pattern, generated based on the determined ABS ratios of each macro access node 202, 204, may be provided to every macro access node 202, 204 located in the geographic area to minimize inter-cell interference from neighboring macro access nodes 202, 204. For example, factors such as jitter, delay, and latency may be used to generate the unique ABS ratios at access nodes 202, 204 and the ABS generator considers the unique ABS ratios when generating the common ABS pattern. The common ABS pattern provides sufficient ABS to accommodate the unique ABS ratios of the macro access node 202, 204 with the highest percentage of ABS in the non-congruent ABS pattern.

At step 308, the common subframe pattern is provided to the small access node. For example, time-domain partitioning protects the DL signaling of small access node 206 at cell edge 242 by periodically muting (stopping) transmissions from macro access nodes 202, 204 in designated subframes, e.g., ABS', to reduce co-channel interference. In an exemplary embodiment, small access node 206 is provided data about the common ABS pattern over, for example, X2 interfaces 222, 228 associated with macro access nodes 202, 204. The small access node 206 can use the data to schedule wireless devices 214, 216 located at the cell edge 242 of small access node 206 without interference from macro access nodes 202, 204.

Time-domain partitioning protects the DL signaling of small access node 206 at cell edge 242 by periodically muting (stopping) transmissions from macro access nodes 202, 204 in designated subframes, e.g., Almost Blank Subframes (ABS), to reduce co-channel interference. In an exemplary embodiment, small access node 206 is provided data about the frequency-domain partitioning and set of muted ABS over, for example, X2 interfaces 222, 228. The small access node 206 can use the data to schedule wireless devices 214, 216 located at the cell edge 242 of small access node 206.

One skilled in the art, using the disclosure provided herein, will appreciate that various steps of the methods can be omitted, rearranged, combined and/or adapted in various ways and can be completed by multiple wireless devices and access nodes, for example between wireless devices 214, 216 and access nodes 202, 204, 206.

Figure 4:
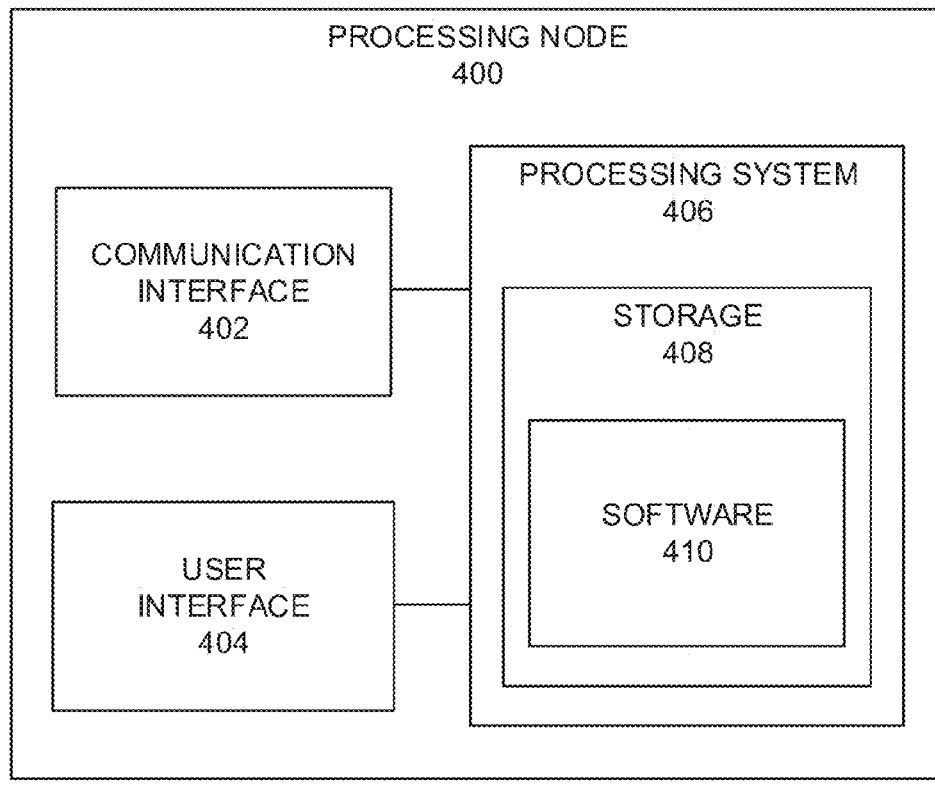
FIG. 4 illustrates an exemplary processing node.

FIG. 4 illustrates an exemplary processing node 400 in a communication system. Processing node 400 comprises communication interface 402, user interface 404, and processing system 406 in communication with communication interface 402 and user interface 404. Processing node 400 can be configured to determine a communication access node for a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include access nodes 106, 108, 202, 204, 206, gateway node 208, and controller nodes 210. Processing node 400 can also be an adjunct or component of a network element, such as an element of access nodes 106, 108, 202, 204, 206, gateway node 208, and controller node 210. Processing node 400 can also be another network element in a communication system. Further, the functionality of processing node 400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for generating a common subframe pattern in a wireless communication network, the method comprising:
synchronizing frame numbers associated with multiple access nodes operating on a same frequency channel in a coverage area;
determining that subframe patterns associated with the multiple access nodes are out-of-sequence with each other, wherein the out-of-sequence subframe patterns of the multiple access nodes each comprise an almost blank subframe (ABS) ratio different from an ABS ratio of at least one other subframe pattern of the out-of-sequence subframe patterns of the multiple access nodes;
generating a common subframe pattern based on the ABS ratios of the out-of-sequence subframe patterns of the multiple access nodes, the common subframe pattern comprising at least a same number of ABS as the subframe pattern of an access node of the multiple access nodes with a highest ABS ratio;
providing the common subframe pattern to each of the multiple access nodes operating in the coverage area; and
scheduling traffic using the common subframe pattern and synchronized frame numbers.

2. The method of claim 1, wherein the frame numbers associated with the multiple access nodes are System Frame Numbers (SFN).

3. The method of claim 1, wherein the common subframe pattern is provided to a small access node located in the coverage area.

4. The method of claim 1, wherein generating the common subframe pattern further comprises:
synching a timing interval associated with each of the multiple access nodes; and
generating a common range for the frame numbers associated with the multiple access nodes.

5. The method of claim 1, wherein transmissions from the multiple access nodes are periodically muted during an ABS of the common subframe pattern.

6. The method of claim 1, wherein a first access node in the multiple access nodes is configured to transmit data during an ABS associated with a second access node in the multiple access nodes.

7. A system for generating a common subframe pattern in a wireless communication network, the system comprising:
a controller configured to:
synchronize frame numbers associated with a plurality of access nodes operating on a same frequency channel in a coverage area;
determine that subframe patterns associated with the plurality of access nodes conflict with each other, wherein the conflicting subframe patterns of the plurality of access nodes each comprise an almost blank subframe (ABS) ratio different from an ABS ratio of at least one other subframe pattern of the conflicting subframe patterns of the the plurality of access nodes;

generate a common subframe pattern based on the ABS ratios of the conflicting subframe patterns of the plurality of access nodes, the common subframe pattern comprising at least a same number of ABS as the subframe pattern of an access node of the plurality of access nodes with a highest ABS ratio;

provide the common subframe pattern to each of the plurality of access nodes; and schedule traffic using the generated common subframe pattern and synchronized frame numbers.

8. The system of claim 7, wherein the frame numbers associated with the plurality of access nodes are System Frame Numbers (SFN).

9. The system of claim 7, wherein the common subframe pattern is provided to a small access node located in the coverage area.

10. The system of claim 7, wherein the controller is further configured to generate the common subframe pattern by synching a timing interval associated with each of the plurality of access nodes and generating a common range for the frame numbers associated with the plurality of access nodes.

11. The system of claim 7, wherein transmissions from the plurality of access nodes are periodically muted during an ABS of the common subframe pattern.

12. The system of claim 7, wherein a first access node in the plurality of access nodes is configured to transmit data during an ABS associated with a second access node in the plurality of access nodes.

* * * * *